US011016869B2

(12) United States Patent
Fanaru et al.

(10) Patent No.: US 11,016,869 B2
(45) Date of Patent: *May 25, 2021

(54) EXTENSIBILITY MODEL FOR USAGE ANALYTICS USED WITH A SYSTEM

(71) Applicant: Microsoft Technology Licensing, LLC, Redmond, WA (US)

(72) Inventors: Adrian Fanaru, Sammamish, WA (US); Darrin Hatakeda, Redmond, WA (US); Gunnar Ljosdahl Rasmussen, Tromso (NO); Krister Mikalsen, Tromso (NO); Dag Steinnes Eidesen, Tromso (NO); Rune Devik, Tromso (NO); John D. Fan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,457

(22) Filed: Jul. 29, 2019

(65) Prior Publication Data

US 2019/0347182 A1 Nov. 14, 2019

Related U.S. Application Data

(63) Continuation of application No. 13/287,831, filed on Nov. 2, 2011, now Pat. No. 10,402,299.

(51) Int. Cl.
*G06F 11/34* (2006.01)

(52) U.S. Cl.
CPC ...... *G06F 11/3438* (2013.01); *G06F 2201/86* (2013.01); *G06F 2201/88* (2013.01)

(58) Field of Classification Search
CPC .... G06Q 10/00; G06Q 40/06; G06F 11/3438; G06F 2201/86; G06F 2201/88
(Continued)

(56) References Cited

U.S. PATENT DOCUMENTS 6,169,534 B1 * 1/2001 Raffel .................... G06Q 10/10
345/473
6,513,052 B1 * 1/2003 Binder ................... G06Q 30/02
(Continued)

OTHER PUBLICATIONS

Elsevier Acquire Knovel Provider of Webbased Productivity Application for the Engineering Community, New York, Jan. 7, 2013, PRNewswire, pp. 1-3 (Year: 2013).*

*Primary Examiner* — Romain Jeanty (57) ABSTRACT

Collected usage information relating to interaction with content is integrated with operation of a system, such as a content management system. The usage information is collected in response to occurrences of usage events. A user may create, configure and define the usage events according to their needs. The user may also configure/define different values that are associated with the different events. For example, a user may specify: when to count a view (e.g. unique user view or each view); what period of time to collect counts; aggregation of counts (e.g. tenant, site, collection); a weighting for the event; a trim value; when to provide the parameter to a search index of the system such that the value is considered by the search engine of the system; whether or not a parameter is configurable by other users, and the like.

19 Claims, 7 Drawing Sheets

(58) Field of Classification Search
USPC .......................................................... 705/7.29
See application file for complete search history.

(56) References Cited

U.S. PATENT DOCUMENTS

| | | | | |
|---|---|---|---|---|
| 6,961,716 | B2* | 11/2005 | Rhodes | H04L 41/142 370/203 |
| 7,092,936 | B1* | 8/2006 | Alonso | G06F 16/3338 707/737 |
| 7,130,810 | B2* | 10/2006 | Foster | G06Q 10/06375 705/80 |
| 8,291,490 | B1* | 10/2012 | Ahmed | G06F 21/604 726/17 |
| 8,732,211 | B2* | 5/2014 | Acuna | G06F 16/211 707/803 |
| 8,984,441 | B2* | 3/2015 | Eyer | G06F 3/04842 715/811 |
| 2001/0014878 | A1* | 8/2001 | Mitra | G06Q 20/10 705/39 |
| 2003/0033253 | A1* | 2/2003 | Rhodes | H04L 41/142 705/52 |
| 2003/0216971 | A1* | 11/2003 | Sick | G06Q 30/06 705/7.36 |
| 2004/0220792 | A1* | 11/2004 | Gallanis | G06F 11/3447 703/13 |
| 2009/0150814 | A1* | 6/2009 | Eyer | G06F 9/451 715/765 |
| 2011/0087966 | A1* | 4/2011 | Leviathan | G06F 16/9577 715/745 |

\* cited by examiner

EXTENSIBILITY MODEL FOR USAGE ANALYTICS USED WITH A SYSTEM

CROSS-REFERENCE TO RELATED APPLICATIONS

This application is a continuation of U.S. patent application Ser. No. 13/287,831, now U.S. Pat. No. 10,402,299, filed on Nov. 2, 2011, and having the title "CONFIGURING USAGE EVENTS THAT AFFECT ANALYTICS OF USAGE INFORMATION," which is incorporated by reference herein in its entirety. To the extent appropriate, priority is claimed to the above referenced application.

BACKGROUND

Different analytics data systems analyze data and produce reports for a user to view. The data analyzed is data that has previously been generated and stored. For example, an analytics data system may be configured to analyze business data, web traffic data, sales data, and the like. The reports may be used for a variety of different purposes by the customer of the analytics data systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Collected usage information relating to interaction with content is integrated with operation of a system, such as a content management system. The usage information is collected in response to occurrences of usage events. A user may create, configure and define the usage events. For example, a user may create a custom event for their system that collects information relating to a view event, a purchase event, a download event, a rating event, a place item in shopping cart event, and the like. The user may also configure/define different values that are associated with the different events that are configured by the user. For example, a user may specify: when to count a view (e.g. unique user view or each view); what period of time to collect counts; aggregation of counts (e.g. tenant, site, collection); a weighting for the event; a trim value; when to provide the parameter to a search index of the system such that the value is considered by the search engine of the system; whether or not a parameter is configurable by other users, and the like. The usage events may be configured through an Application Programming Interface (API) and/or through a User Interface (UI). The analysis engine that provides different usage information analytics for a user operates according to the usage events defined by the user.

DETAILED DESCRIPTION

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
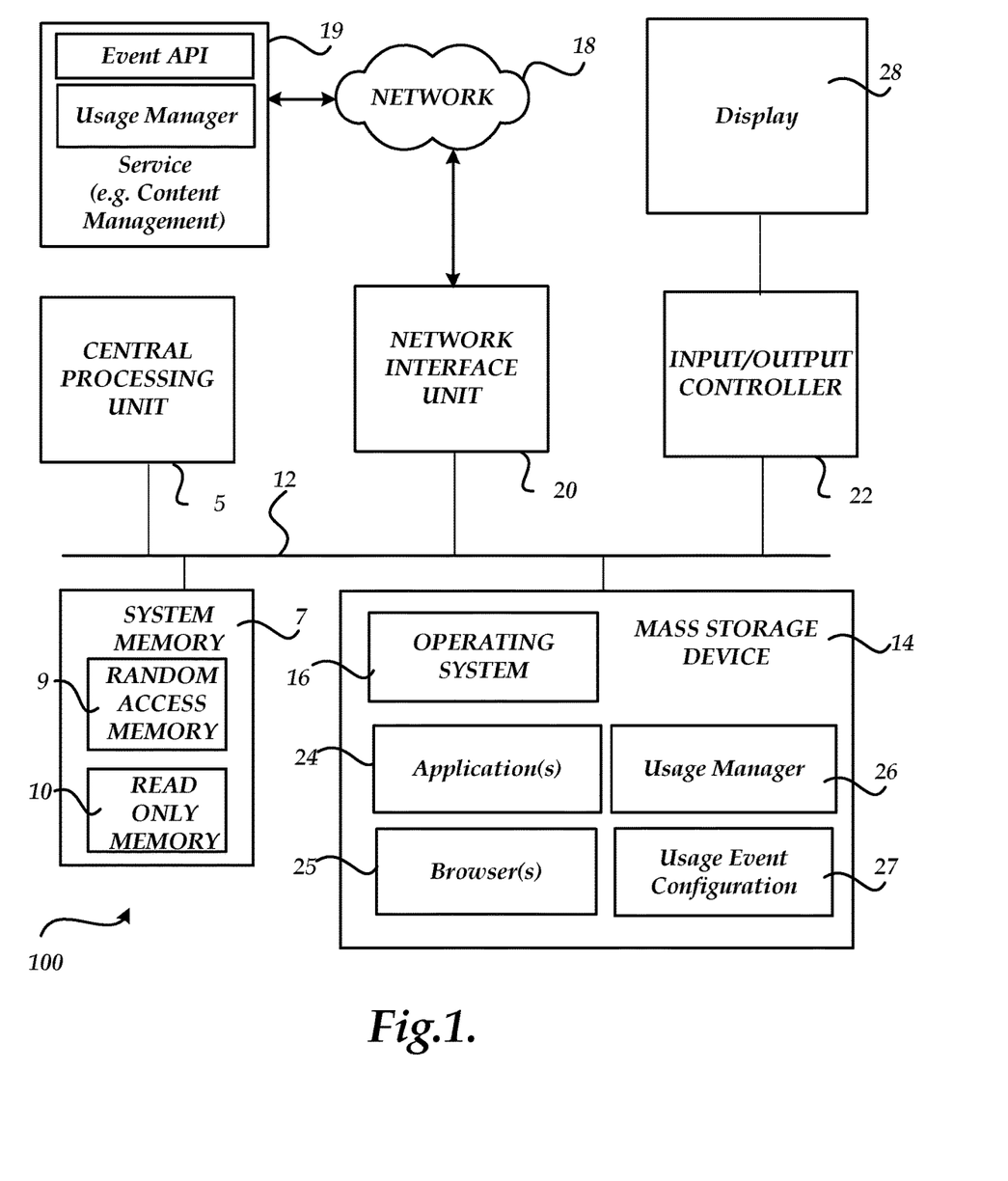
FIG. 1 illustrates an exemplary computing device.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, usage event configuration 27, and other program modules, such as Web browser 25, and usage manager 26, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computer 100 on the single integrated circuit (chip).

As mentioned briefly above, a number of program modules and data files may be stored in the mass storage device 14 and RAM 9 of the computer 100, including an operating system 16 suitable for controlling the operation of a networked computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as a usage manager 26, productivity applications (e.g. a content management application such MICROSOFT SHAREPOINT), and may store one or more Web browsers 25. The Web browser 25 is operative to request, receive, render, and provide interactivity with electronic content, such as Web pages, videos, documents, and the like. According to an embodiment, the Web browser comprises the INTERNET EXPLORER Web browser application program from MICROSOFT CORPORATION.

Usage manager 26 is configured to integrate collected usage information configured through usage events relating to user interaction with content for a system, such as a content management system. Usage manager 26 may be configured as an application/process and/or as part of a cloud based multi-tenant service that provides resources (e.g. services, data . . . ) to different tenants (e.g. MICROSOFT OFFICE 365, MICROSOFT SHAREPOINT ONLINE). Generally, usage manager 26 is configured to collect usage information according to usage events as configured by a user and to integrate the content to affect an operation of a system, such as service 19. The usage information may relate to different types of interaction with content (e.g. viewed, selected, purchased, recommended, downloaded, and the like). The usage information of content is collected, stored and provided to the system. The usage information may be integrated with the operation of the system in many different ways. For example, the usage information may be associated with a search service of the system such that the results provided by the search service are filtered based on the collected usage information (e.g. recommendations for other content, popular content, most "liked" content, content viewed by a type of user, and the like). The usage information may also be used to adjust different operations of the service. For example, the usage information may be used to adjust: a retention time of content (e.g. don't delete a recently viewed document), a crawl policy of content; a backup policy of content; restore schedules; identification of storage tier levels for content; and the like. The usage information may be analyzed and aggregated at different levels (e.g. site, tenant, system) that may be used to filter results that are provided to a user.

The usage information is collected in response to occurrences of usage events. A user may create, configure and define the usage events according to their needs. For example, a user may create a custom event for their system that collects information relating to a view event, a purchase event, a download event, a rating event, a place item in shopping cart event, and the like. The user may also configure/define different values that are associated with the different events. For example, a user may specify: when to count a view (e.g. unique user view or each view); what period of time to collect counts; aggregation of counts (e.g. tenant, site, collection); a weighting for the event; a trim value; when to provide the parameter to a search index of the system such that the value is considered by the search engine of the system; whether or not a parameter is configurable by other users, and the like. The usage events may be configured through an Application Programming Interface (API) and/or through a User Interface (UI). The analysis engine that provides different usage information analytics for a user operates according to the usage events defined by the user.

Additional details regarding the operation of usage manager 26 and the configuration of usage events by a user and integration of collected usage information will be provided below.

Figure 2:
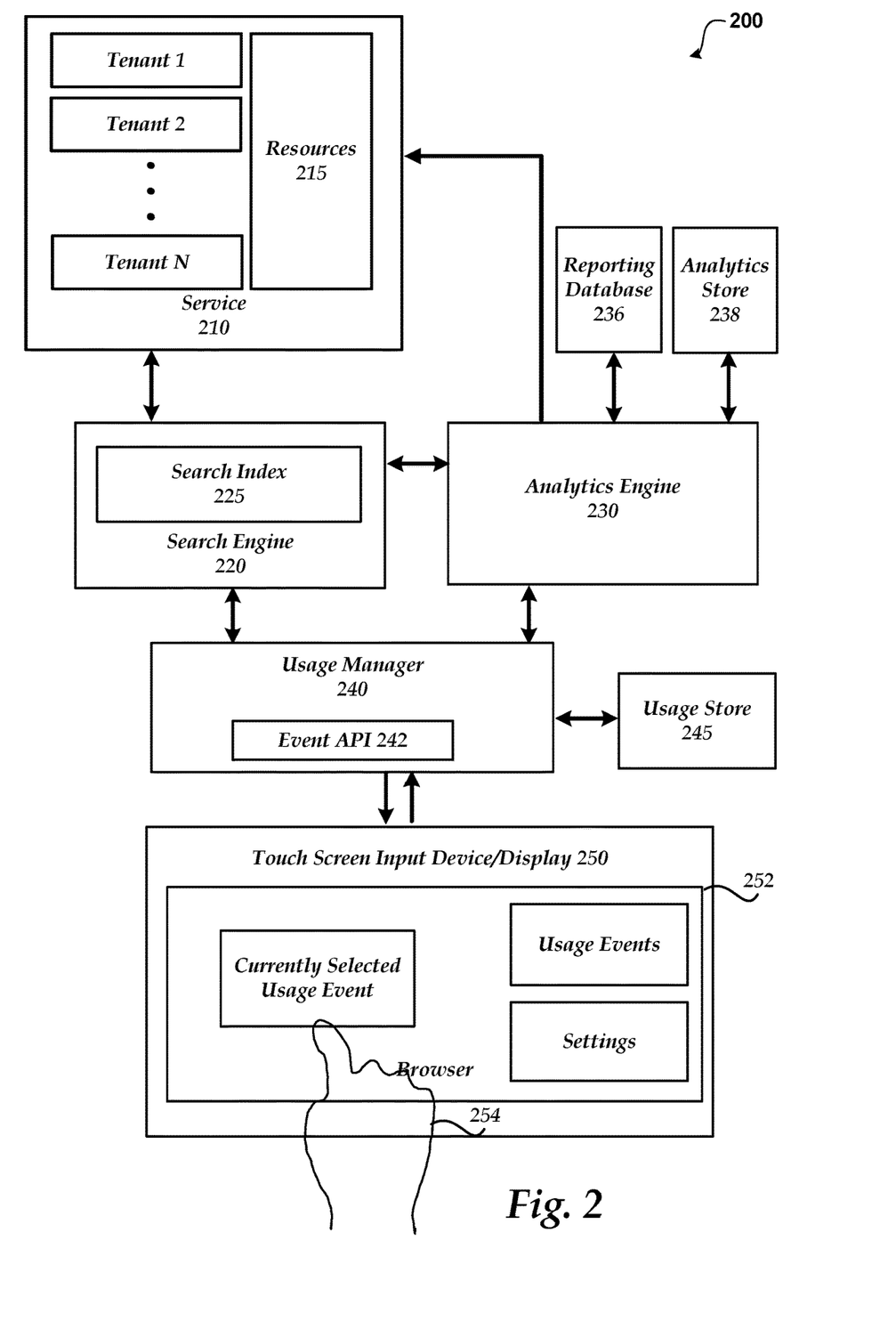
FIG. 2 illustrates an exemplary system for integrating usage information and user configured usage events with operation of a service.

FIG. 2 illustrates an exemplary system for integrating usage information and user configured usage events with operation of a service. As illustrated, system 200 includes service application 210, search engine 220, analytics engine 230, analytics store 238, reporting database 236, usage manager 240, usage store 245 and touch screen input device/display 250. As illustrated, service 210 is a cloud based and/or enterprise based service that is configured to provide content management services (e.g. MICROSOFT SHAREPOINT). Service 210 may also be configured as a client based application. Although system 200 shows a content management service, other services/applications may be configured to integrate collected usage information that is used to adjust the application/service's operation.

As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data. For example, service 210 may be configured to provide services corresponding to productivity applications (e.g. content management, word processing, spreadsheet, presentation, messaging . . . ), and the like.

System 200 as illustrated comprises a touch screen input device/display 250 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

As illustrated, touch screen input device/display 250 shows an exemplary UI display 252 for configuring usage events (e.g. when and how to collect interaction with content) and displaying information to a user. Usage manager 240 is configured to receive input from a user (e.g. using touch-sensitive input device 250 and/or keyboard input (e.g. a physical keyboard and/or SIP)). For example, usage manager 240 may receive touch input 254 that is associated with a UI 252 for configuring usage events and/or input to use an event API for configuring the usage events with operation of a service.

The usage manager 240 may be stored at one or more locations and may be accessed from one or more different locations. For example, a user may access a cloud-based usage manager using a web browser, using a locally installed usage manager that is configured to communicate with the search service application, and/or a combination of a cloud based service and an installed usage manager. According to an embodiment, usage manager 240 operates on each server computing device that receives user interaction with content/resources of service 210.

Usage manager 240 is configured to collect usage information from users of a service (e.g. service 210). Usage manager 240 is also configured to assist in the configuration of usage events. Usage information may be obtained from more than one service. For example, usage information may be obtained from one or more other services that is integrated with the operation of service 210. The usage information may contain a variety of different information. For example, the usage information may relate to a view of content, a download of content, preview of content, a user rating of content, a purchase of content, a recommendation of content, and the like. The collected usage information is stored within usage store 245.

The usage information is collected in response to occurrences of usage events. A user may create, configure and define the usage events according to their needs. For example, a user may create a custom event for their system that collects information relating to a view event, a purchase event, a download event, a rating event, a place item in shopping cart event, and the like. The user may also configure/define different values that are associated with the different events. For example, a user may specify: when to count a view (e.g. unique user view or each view); what period of time to collect counts; aggregation of counts (e.g. tenant, site, collection); a weighting for the event; a trim value; when to provide the parameter to a search index of the system such that the value is considered by the search engine of the system; whether or not a parameter is configurable by other users, and the like. The usage events may be configured through an Application Programming Interface (API) and/or through a User Interface (UI). The analysis engine that provides different usage information analytics for a user operates according to the usage events defined by the user.

Usage manager 240 provides the collected usage information to analytics engine 230 and/or search engine 220. The usage information may be provided at predetermined times and/or upon being received. For example, the usage information may be provided to analytics engine 230 each day, each hour, every 15 minutes and the like.

Analytics engine 230 may be configured to perform different types of analysis using the collected usage information. For example, analytics engine 230 may be configured to determine the most popular content, related content, personalized content, new content, recommendations based on social network(s), most profitable items, most recommended items, and the like. Analytics engine 230 may also aggregate data at different levels. For example, for a content management service 210 including tenants and sites, analytics engine 230 may aggregate data at a site level, a tenant level and at the service level. Analytics engine 230 may also aggregate usage information for a specified period of time (e.g. last hour, day, week, month, quarter, year, and the like).

The analytics engine 230 may be configured differently based on the system/service to which the usage information applies. For example, for an online store, the analytics engine 230 may be configured as a recommendation system and a sales system (e.g. item recommendations, related item content, recommendations, . . . ). For a service that provides content (e.g. video, music, new stories, document . . . ), analytics engine 230 may be configured to provide related content to view, recommended content to view, most recently accessed content, most popular items, and the like.

Users of the system may configure usage events that affect the collection of the usage information as well as affect the results provided by the analytics engine. For example, a user may specify a weight value for a usage event that affects a recommendation for an item and/or a weight that affects a popularity of an item.

For example, a user may want to show the most popular items based on who has reviewed the items recently. One user may configure a usage event to include counts of user information for an item for only seven days to determine popularity whereas another user may set the time period to 14 days. The user may create a new usage event and/or modify a pre-existing usage event. The user may also determine what views to count. For example, a user may configure to count application views, server views, browser views, page views, views coming via links and to not count robot views, crawl views, test script views, web service calls, programmatic calls.

A user may also configure a weighting that affects recommendations of items that are determined by the analytics engine 230. A user may determine that certain events in their system should influence recommendations more than others. For example, the user configuring the event may determine that if a user "buys" two items together that shows a stronger correlation compared to a user just viewing those same two items in the same session. The user also add usage events that are weighted more than a view event, such as when a user expresses interest in the item (e.g. adds to a wish list, recommends an item, adds an item to shopping cart, remains on a page showing the item greater than a certain amount of time (linger), and the like. A user of a system may also decide to configure a weightings for usage events differently. For example, one user may have determined that when a user reviews items together in the same session, it is three times more likely that the items are correlated. The user creates a usage event and instruments the "review" actions trigger that event. The user also sets the recommendations weight option to three.

Search engine 220 is configured to receive collected usage information and store the usage information within a search index (e.g. search index 225). The usage information may be raw usage information received directly from usage manager 240 and/or usage information that has already been analyzed. When a user performs a query and/or identifies content/item, the search engine 220 returns results based on the identification of content and any related content identified using the collected usage information related to the identification of the content. For example, the search results may include the most popular results as determined by users (e.g. views, recommendations, ratings . . . ), new content that has recently been added, recommended items as determined by analytics engine 230, items your friends have recently viewed/recommended (e.g. through a social network), and the like.

The user may configure usage events to specify what values are to be stored within the search index. For example, one user may specify that unique views for the last two weeks are to be stored within the search index. Another user of another system/site may configure the usage events to store all hits within the search index for the last year.

The recommendations may include a variety of recommendations, such as related items, personalized recommendations, social recommendations and the like. The search results may be filtered based on a variety of different data (e.g. cost of item, popularity of item, margin of item, and the like). Some example searches may include searches such as: How many documents were tagged with "KCI" in the last week/month? How many documents were tagged by John Doe with "KCI" in the last week/month? What are the documents that were not used in the last 6 months? What are the most popular documents (number of views)? What were the most popular documents last week/last month/two, three weeks ago? What were the most popular authors? What are the most popular tags? What were the most popular tags in the last week? What tags/metadata are trending up/down in absolute/percentage values? What is the intersection between most popular documents and most popular tags? For example, there are a lots of new documents tagged with "BLABLA" but there have been very few views of these new documents. Are the documents miss-categorized or just not interesting to anyone?

Service 210 may integrate the usage information with its operation. Service 210 may utilize the usage information to alter: a retention time of content, a crawl policy of content; a backup policy of content; restore schedules; storage tier levels; and the like. For example, service 210 may automatically alter its retention policy to save content for a period of time longer/shorter for content based on when content is accessed, how many times content has been viewed within a time period, and the like (e.g. content is maintained a week longer if accessed within a week before scheduled deletion date). A crawl schedule may be updated based on usage information (e.g. popular content is crawled more often). A storage tier level (e.g. content to store online, content to be backed up, content to be stored off-line, . . . ) may be identified based on the collected usage information (e.g. popular content is stored online and unpopular content is stored in offline storage). Computing resources for a tenant/site/collection may also be adjusted based on the collected usage information (e.g. more resources provided to heavily viewed content, a large number of downloads, and the like). Service 210 may also use the analytics engine 230 to track document lifecycle events, trends, social data, and the like.

Figure 3:
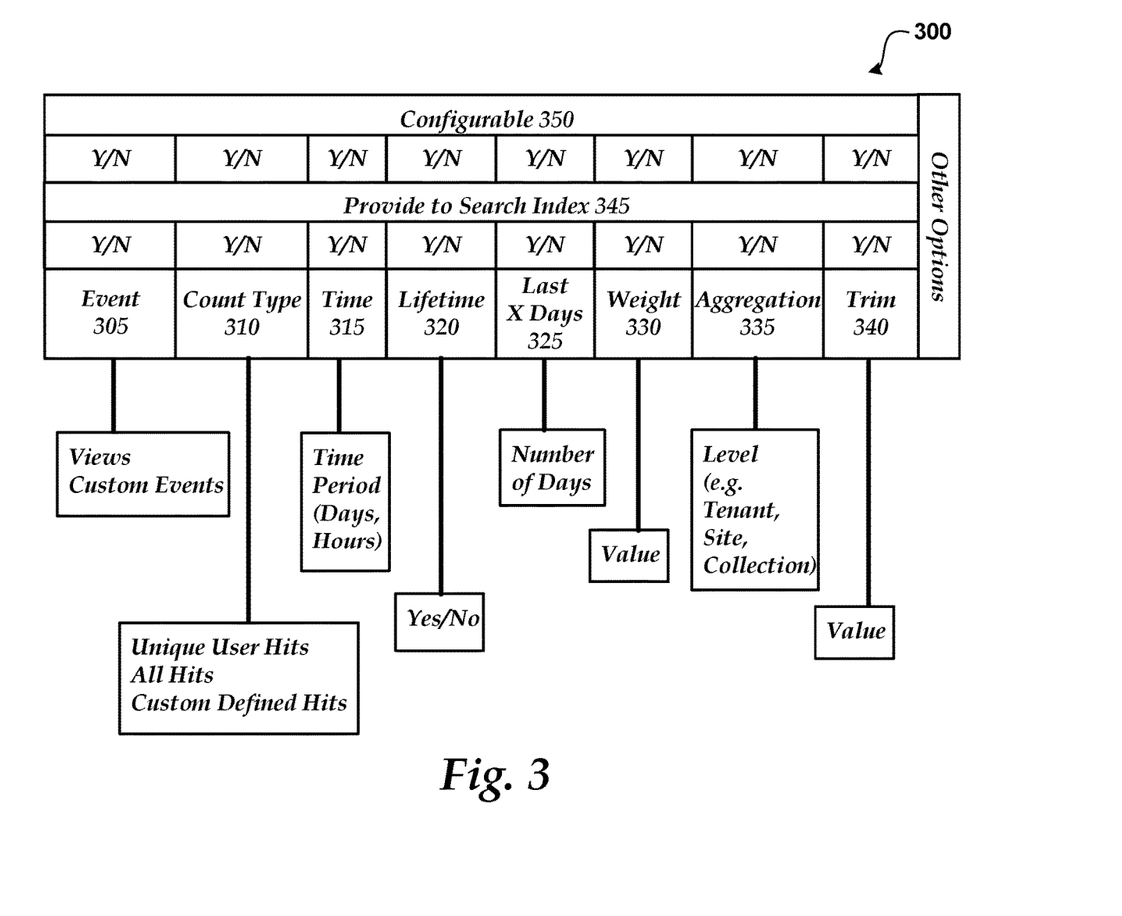
FIG. 3 shows an exemplary usage event with event configuration options.

FIG. 3 shows an exemplary usage event with event configuration options. As illustrated, event 300 comprise an event name 305, a count type 310, a time option 315, a lifetime option 320, a "last X days" option 325, a weighting option 330, an aggregation option 335, a trim option 340, other settings, provide to search index options 345 and configurable options 350. More or fewer options may be included.

Many different usage events may be configured/created by a user. Some of the events may be predefined events that are included within an API and some of the events may be created by a user. For example, a system may provide a base set of usage events (e.g. views, clicks) and provide an API/UI for a user to configure other desired usage events (e.g. buys, likes, rated, recommended, hovering over/near content, uploading content, and the like. According to an embodiment, the usage events are configured through an API.

Event 305 specifies a name of the event. The name may be defined for the usage event by the user. For example, a user may specify a user friendly name for the usage event.

Count Type 310 defines how to aggregate a count of the event. For example, aggregate on hits of unique users, aggregate on each hit, aggregate both unique users and hits and store each count separately, and custom defined hits. For example, a user may decide to count views made by a specific classification of users (e.g. women/men/students . . . ). A user may specify what counts are provided to the search index using provide to search index option 345. For example, a user may configure to send a unique user count to the search index but not to send an all hit count to the search index even though the event counts all hits.

Time option 315 defines a time period to keep the defined counts (e.g. number of days). The specified time value may also be used to specify how long to keep the counts in the search index (e.g. configurable option 350) and/or in a reporting database for the system. According to an embodiment, more than one time value may be stored for the event.

Lifetime option 320 represents whether or not to maintain lifetime counts for an event. The user may specify whether or not to keep the lifetime counts within the search index through provide to search index option 345.

Last X Days option 325 represents aggregated counts for a given period of time (e.g. events that occur within the last X number of days). The user may specify whether or not to keep the lifetime counts within the search index through provide to search index option 345.

Weight option 330 defines a weight value an occurrence of the usage event has on a recommendations calculation. This weight is used when calculating the importance of a link between two items in a recommendation algorithm. A recommendation weight that is higher is treated as more important by the analysis engine than an event with a low recommendation weight. The user may specify whether or not to store the adjusted value of the count with respect to the assigned weight within the search index using provide to search index option 345. For example, a user may value a purchase event 5× more than a view event but they may/may not want to store the higher assigned value within the search index.

Aggregation option 335 defines how/when to aggregate/roll up counts. For example, a user may aggregate counts for the tenant and/or site collection and/or scope id. According to an embodiment, the rollup is automatically performed for predetermined levels (e.g. tenant, site, collection) and stored within a Reporting Database. The user may specify whether or not to store any/all of the aggregations within the search index using provide to search index option 345.

Trim option 340 defines a traffic value used to determine when to perform an update to the Reporting Database and/or Search Index. For example, If, for a given event type, there is less than the defined number of events for a piece of content/item, the usage events are dropped. The user may specify whether or not to store the counts (even though they may be dropped for analysis purposes) within the search index using provide to search index option 345.

Other options may also be configured/set. A user may specify an option that affects a count of an event. For example, a create an option that is used by an the analysis engine to affect the retention operation of the system (e.g. when accessed within the last week don't delete the content according to retention policy). The user may also define a popularity weight option that weights the occurrence of the event for determining the popularity of the content/item. For example, an event that has a higher popularity weight option will be counted more when content is accessed for popularity purposes as compared to a lower valued event.

Configurable options 350 may/may not be used. Configurable options 350 is configured to allow an authorized user to determine whether or not an option is configurable by another user. For example, a tenant administrator may restrict a site administrator from configuring a count type option and a time option, while allowing the other options to be configured. According to an embodiment, the configurable options 350 are definable at a tenant level of the system.

Figure 4:
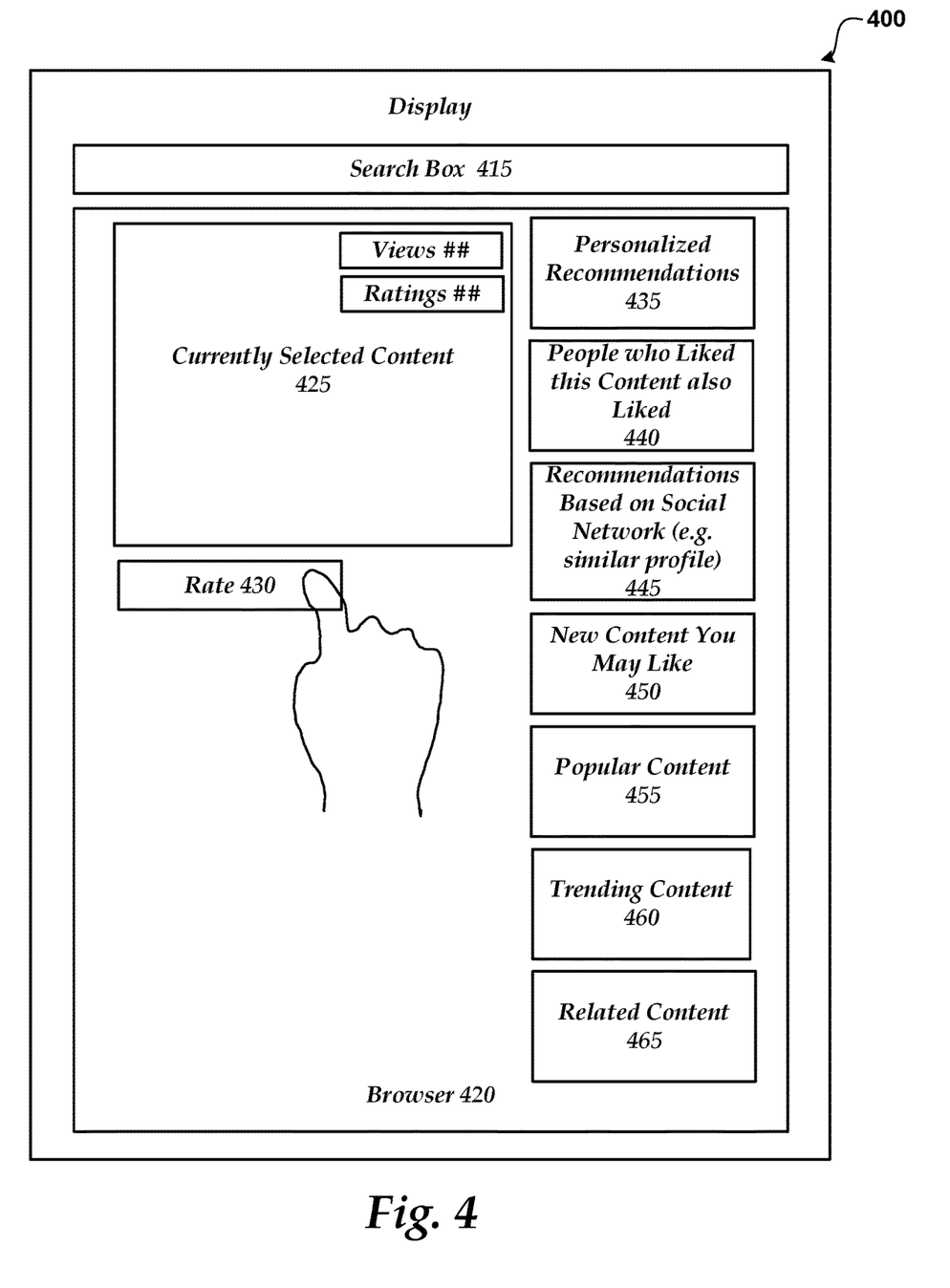
FIG. 4 shows an exemplary display that integrates usage information as collected and calculated using the user configured events with results returned in a search.

FIG. 4 shows an exemplary display that integrates usage information as collected and calculated using the user configured events with results returned in a search.

As illustrated, display 400 includes search box 415, browser 420 including a display of currently selected content 425, rate option 430, personalized recommendations 435, people who like this content also liked 440, social network recommendations 445, new content you may like 450, popular content 455, trending content 460 and related content 465. More or less information may be displayed. The different information displayed in display 400 is for purposes of explanation and is not intended to be limiting.

Content may be identified by a search engine of a service in response to a variety of different actions. For example, a user may enter a query in search box 415 to obtain search results. A user may also navigate to the currently selected content (e.g. select content (product, content)) that the user is interested in viewing. The search results returned to the user may be filtered based on the collected usage information.

In the current example, the user personalized recommendations 435, people who like this content also liked 440, social network recommendations 445, new content you may like 450, popular content 455, trending content 460 and related content 465 are determined in part on the collected usage information and the identification of the content through entry of a search query or navigation to the content. The displayed content may include a display of usage information that relates to the content. For example, currently selected content 425 shows a number of views for the content and a number of ratings for the content.

Personalized recommendations 435 are recommendations of content that are based on a user's past actions (e.g. views, ratings, recommendations). The recommendations may also be based on related items to the currently selected content. For example, if a user is viewing a shirt, they may have also viewed pants, shoes and belts.

People who liked this content also liked 440 is based on other users who have viewed the currently selected content 425 and other items that they also viewed. For example, other users who liked the currently selected content 425 also liked this other content.

Recommendations based on Social Networks 445 are items that are recommended by a user's profile and/or people within the user's social network(s).

New content you may like 450 is content that has been recently added. For example, the new content may be content that has been added in the last week, month, and the like.

Popular content 455 shows the user content that is popular for the current search. The content that is popular for the current search may include content determined from one or more searches related to the current search. For example, when the search relates to item X, the popular content may include content related to most viewed items in a category relating to item X Trending content 460 is content that is on its way up in popularity (e.g. recently popular and becoming more popular).

Related content 465 is content that is related to the currently selected content but is content that is not typically returned in response to a search for the currently selected content.

Rating button 430 may be selected for a user to rate content. For example, a user may rate the content on a scale (e.g. 1-10, like, dislike). The rating information is provided to the service and included within a search index.

Figure 5:
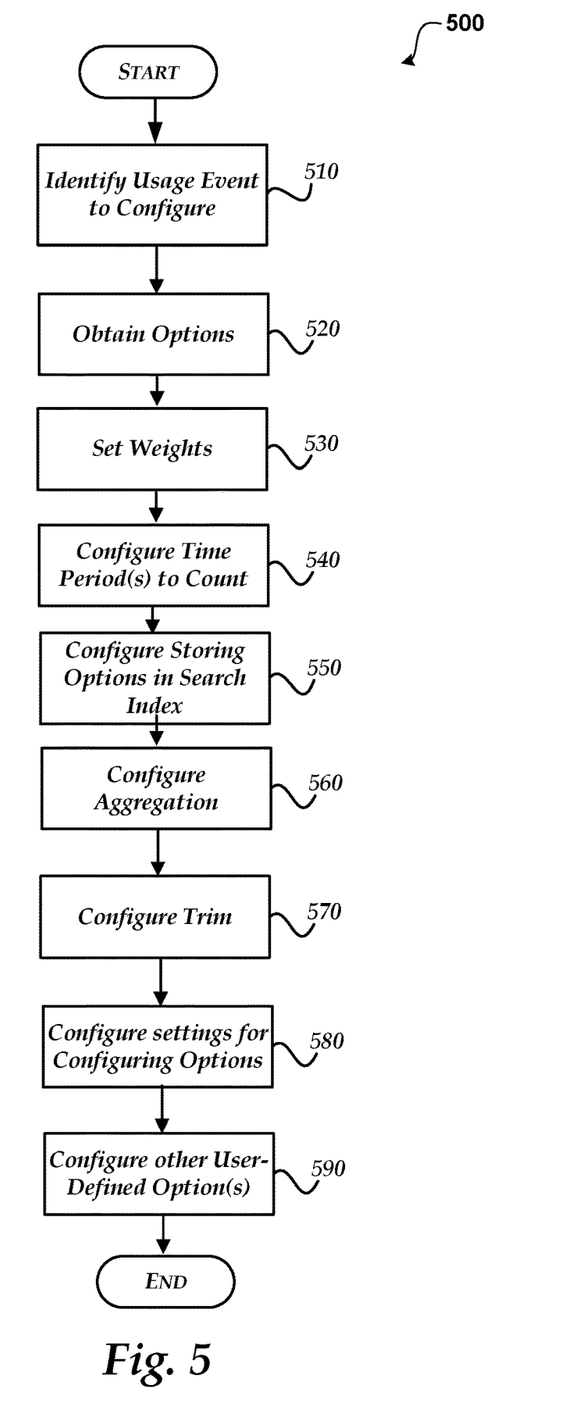
FIG. 5 shows a process for configuring usage events.
Figure 6:
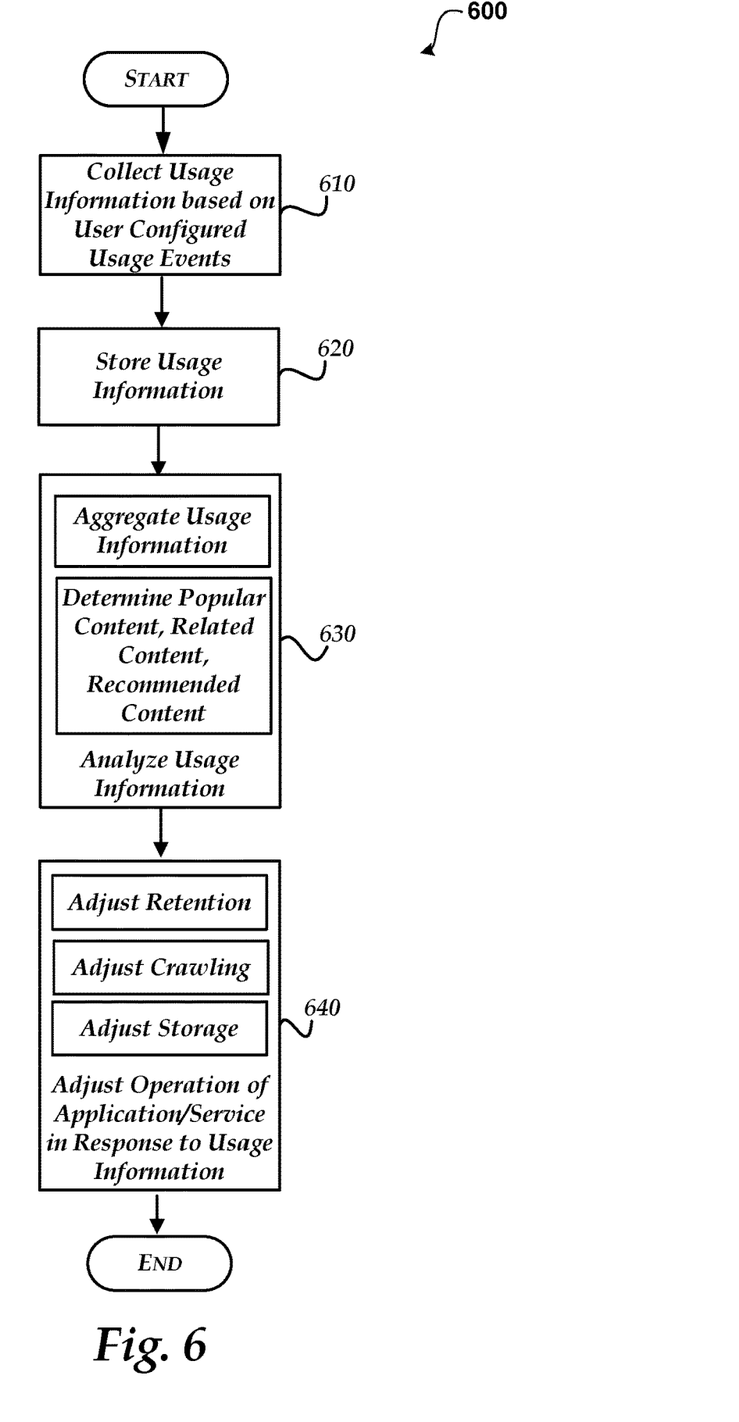
FIG. 6 shows a process for collecting usage information and integrating the usage information with operation of a system.
Figure 7:
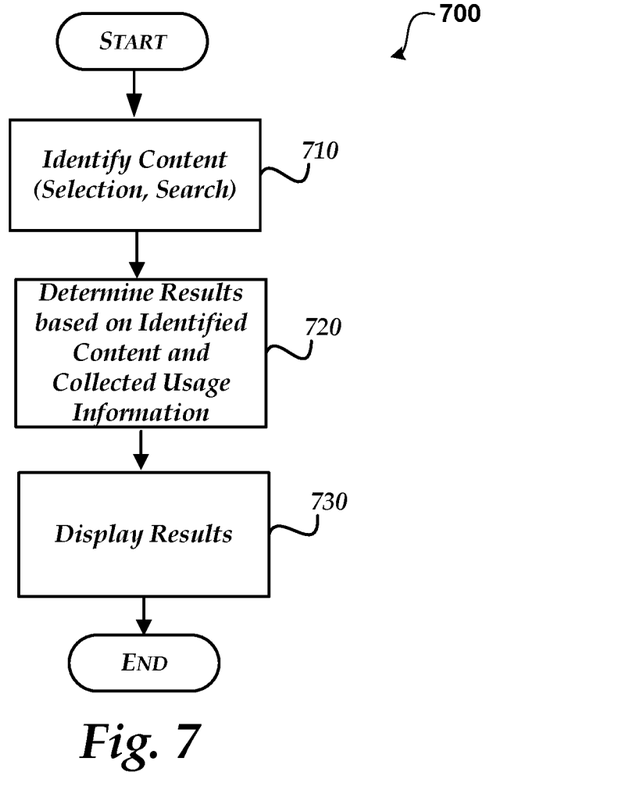
FIG. 7 illustrates a process for displaying search results that use collected usage information.

FIGS. 5-7 show an illustrative process for integrating usage information with real-time presentation of content for a system. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are illustrated in an order, the ordering of the operations may change depending on the configuration.

FIG. 5 shows a process for configuring usage events.

After a start operation, the process flows to operation 510, where a usage event to configure/create is selected. For example, a user may select an already created usage event to modify or select to create a new usage event. The selection/identification of the usage event to configure/create may occur using different methods. For example, the usage event to create/configure may be identified through a UI and/or through the use of an API. For example, the API may provide a function for obtaining each of the previously defined usage events for a user and a function for creating a new function. Functions may also be included to set/configure the different options for each of the usage events.

Moving to operation 520, the options available to set for the identified usage event are obtained. For example, an API may be provided that returns the options that are configured for an identified usage event. According to an embodiment, a default set of options are included with each usage event (e.g. event name, count type, time option, lifetime option, weight option(s), aggregation option(s), trim options, search options, configurable options, and user-defined options.

Flowing to operation 530, any weight options for the identified usage event are configured. For example, a recommendation weight and a popularity weight may be set. The recommendation weight is used when calculating the importance of a link between items in a recommendation algorithm. The popularity weight is used when calculating a popularity of an item.

Transitioning to operation 540, time period(s) to count an occurrence of the usage event are configured. For example, a time period may specify a time period to keep a count (e.g. number of days) of the item. The specified time value may also be used to specify how long to keep the counts in the search index and/or in a reporting database for the system.

Moving to operation 550, the information to store within the search index for the usage event are determined. For example, a user may configure what counts to include in the search index (e.g. all counts, unique user counts, adjusted counts based on assigned weight, aggregated counts, and the like).

Flowing to operation 560, aggregation for the usage event are determined. For example, a user may aggregate counts for the tenant and/or site collection and/or scope id.

Transitioning to operation 570, a trim option may be configured. For example, If, for a given event type, there is less than the defined number of events for a piece of content/item, the usage events are dropped.

Moving to operation 580, the user may configure what options are configurable by other users. Configurable options 350 is configured to allow an authorized user to determine whether or not an option is configurable by another user. For example, a tenant administrator may restrict a site administrator from configuring a count type option and a time option, while allowing the other options to be configured.

Flowing to operation 590, the user may configure/create other options. For example, options may be used to help in adjusting an operation of the system (e.g. retention time of content, a crawl policy of content, a backup policy of content, restore schedules, storage tier levels, and the like).

The process then moves to an end operation and returns to processing other actions.

FIG. 6 shows a process for collecting usage information and integrating the usage information with operation of a system.

After a start operation, the process flows to operation 610 where usage information is collected according to user configured usage events. The usage information may relate to different types of user interaction with content (e.g. viewed, selected, purchased, recommended, downloaded, and the like) as well as system interaction with the content (e.g. automated system events). Generally, any usage information that interacts with content that can be collected.

Moving to operation 620, the collected usage information is stored. The collected usage information may be stored in a data store and/or within a search index that is used by the service. The collected usage information may be stored before and/or after the usage information is analyzed (see operation 630). The stored usage information may be raw usage information collected and/or usage information that has already been analyzed. When a user performs a query and/or selects content, the search engine may be configured to return results based on the query/selection and any related usage information related to the search query.

Flowing to operation 630, the collected usage information is analyzed. Different types of analysis may be performed using the collected usage information. For example, usage information may be used to determine: popular content, related content, personalized content, newly added content, recommendations based on social network(s), most profitable items, most recommended items, and the like. Usage information may also be aggregated at different levels. For example, usage information may be aggregated at a site level, a tenant level and at the service level. Usage information may also be aggregated for a specified period of time (e.g. last hour, day, week, month, quarter, year, and the like).

Transitioning to operation 640, operation of the application/service is automatically adjusted in response to the integration of the collected usage information. For example, the collected usage information may be used to affect: a retention time of content, a crawl policy of content; a backup policy of content; restore schedules; storage tier levels; and the like.

The process then moves to an end operation and returns to processing other actions.

FIG. 7 illustrates a process for displaying search results that use collected usage information.

After a start operation, the process 700 flows to operation 710, where content is identified. Content may be identified using different methods. For example, a user may enter a search query and/or navigate to content.

Moving to operation 720, results to display that use the collected usage information are determined. For example, the results may include content identified to be: user personalized recommendations, people who like this content also liked this presented content, social network recommendations, new content a user may like, popular content, trending content and related content, and the like.

Flowing to operation 730, the results are displayed. The displayed results may also include a display of usage information that relates to the content. For example, the results displayed may show a number of views for the content and a number of ratings for the content.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
providing a user interface for configuring usage events, wherein the usage events include options to customize the usage events for a tenant of a computing system;
receiving, through the user interface, values for the options, wherein the values include at least a time period for collecting the usage events;
collecting usage information from devices connected to the computing system in response to inputs to the devices, the usage information including occurrences of the usage events generated by the devices, the usage events being associated with activities related to content encoded on a data store;
receiving by an analytics engine the usage information and aggregating the usage information for the time period; and
automatically altering operations of the computing system based on the aggregated usage information.

2. The method of claim 1, wherein the computing system is a content management system that comprises tenants and sites.

3. The method of claim 2, wherein the operations include at least one of a retention time of the content, a crawl policy of the content, a backup policy of the content, a restore schedule of the content, and one or more storage tier levels of the content.

4. The method of claim 3, wherein receiving the values for the options comprises obtaining a weight value that affects at least one of: a popularity of the content and a recommendation of the content.

5. The method of claim 3, wherein receiving the values for the options further comprises obtaining a user defined event that specifies one or more configurable options.

6. The method of claim 3, further comprising receiving additional configuration information from a user that specifies what options are configurable by a user of the tenant.

7. The method of claim 1, further comprising receiving additional configuration information from a user that specifies options to store within a search index for the computing system.

8. The method of claim 1, further comprising receiving additional configuration information from a user that specifies what views of the content that are included within a count for the content.

9. A computer-readable storage device having computer-executable instructions which, when executed on a computing system, will cause the computing system to perform a method, the method comprising:
providing a user interface for configuring usage events, wherein the usage events include options to customize the usage events for a tenant of a computing system;
receiving, through the user interface, values for the options, wherein the values include at least a time period for collecting the usage events;
collecting usage information from devices connected to the computing system in response to inputs to the devices, the usage information including occurrences of the usage events generated by the devices, the usage events being associated with activities related to content encoded on a data store
receiving by an analytics engine the usage information and aggregating the usage information for the time period; and
automatically altering operations of the computing system based on the aggregated usage information.

10. The computer-readable storage device of claim 9, wherein the operations include at least one of a retention time of the content, a crawl policy of the content, a backup policy of the content, a restore schedule of the content, and one or more storage tier levels of the content.

11. The computer-readable storage device of claim 10, wherein receiving the values for the options comprises obtaining a weight value that affects at least one of: a popularity of the content and a recommendation of the content.

12. The computer-readable storage device of claim 9, further the method comprising receiving additional configuration information from a user that specifies options to store within a search index for the computing system.

13. The computer-readable storage device of claim 9, the method further comprising providing an Application Programming Interface (API) to a user to configure the usage events.

14. A system for providing services corresponding to productivity applications comprising:
a data store encoded with content associated with the productivity applications;
a usage manager that collects usage information from devices connected to a computing system in response to inputs to the devices, the usage information including occurrences of usage events generated by the devices, the usage events being associated with activities related to the content, wherein the usage events are defined on a per tenant basis, and wherein the usage manager further has a user interface for creating the usage events and to provide the usage information, wherein the user interface further includes options to customize the usage events for a tenant of a computing system, and wherein the usage manager is adapted to receive, through the user interface, values for the options, wherein the values include at least a time period for collecting the usage events; and
an analytics engine that receives the usage information and aggregates the usage information for the time period, the analytics engine further automatically altering operations of the system based on the aggregated usage information.

15. The system of claim 14, wherein the usage events comprise a plurality of options, the plurality of options comprising a plurality of values, the plurality of values comprising a weight value that affects at least one of: a popularity of the content and a recommendation of the content.

16. The system of claim 14, wherein the usage events comprise a plurality of options, the plurality of options comprising a plurality of values.

17. The system of claim 14, wherein the usage manager further receives additional configuration information from the user that specifies options to store within a search index for the system.

18. The system of claim 14, wherein the operations include at least one of a retention time of the content, a crawl policy of the content, a backup policy of the content, a restore schedule of the content, and one or more storage tier levels of the content.

19. The system of claim 14, wherein the usage manager further receives additional configuration information from a user that specifies what views of the content that are included within a count for the content.

* * * * *